United States Patent
Parvez et al.

(10) Patent No.: US 9,546,275 B2
(45) Date of Patent: Jan. 17, 2017

(54) ENHANCING PROPERTIES OF SULFUR EXTENDED ASPHALT USING POLYETHYLENE WAX

(71) Applicants: Saudi Arabian Oil Company, Dhahran (SA); King Fahd University of Petroleum and Minerals, Dhahran (SA)

(72) Inventors: Mohammad Anwar Parvez, Dhahran (SA); Hamad I. Al-Abdul Wahhab, Dhahran (SA); Ibnelwaleed A. Hussein, Dhahran (SA); Mohammed Al-Mehthel, Dhahran (SA); Saleh H. Al-Idi, Dhahran (SA)

(73) Assignees: Saudi Arabian Oil Company, Dhahran (SA); King Fahd University of Petroleum and Minerals, Dhahran (SA)

( * ) Notice: Subject to any disclaimer, the term of this patent is extended or adjusted under 35 U.S.C. 154(b) by 294 days.

(21) Appl. No.: 13/859,324

(22) Filed: Apr. 9, 2013

(65) Prior Publication Data
US 2014/0299017 A1 Oct. 9, 2014

(51) Int. Cl.
*C08L 95/00* (2006.01)

(52) U.S. Cl.
CPC ............ *C08L 95/00* (2013.01); *C08L 2555/52* (2013.01)

(58) Field of Classification Search
None
See application file for complete search history.

(56) References Cited

U.S. PATENT DOCUMENTS

| 4,080,350 A | 3/1978 | Briscoe et al. |
| 4,242,143 A | 12/1980 | Hagenbach et al. |
| 4,978,698 A | 12/1990 | Woodhams |
| 5,494,966 A | 2/1996 | Hesp et al. |
| 5,705,564 A | 1/1998 | Liang et al. |
| 5,708,061 A | 1/1998 | Hesp et al. |

(Continued)

FOREIGN PATENT DOCUMENTS

| CN | 1990584 | 12/2005 |
| CN | 1990585 | 12/2005 |

(Continued)

OTHER PUBLICATIONS

Edwards, Ylva, et al., Effects of commercial waxes on asphalt concrete mixtures performance at low and medium temperatures, Cold Regions Science and Technology, 2006, pp. 31-41, Vo. 45, Elsevier, B.V.

(Continued)

*Primary Examiner* — Colin W Slifka
(74) *Attorney, Agent, or Firm* — Bracewell LLP; Constance Gall Rhebergen

(57) ABSTRACT

This invention relates to asphalt compositions. More specifically, this invention relates to asphalt binder compositions including asphalt, elemental sulfur and polyethylene wax, and methods of making the same. In some aspects, the invention provides a sulfur wax asphalt binder composition that includes a base asphalt having viscoelastic properties, an elemental sulfur, and a polyethylene wax. The polyethylene wax is combined with the base asphalt and the elemental sulfur to create the sulfur wax asphalt binder composition. The polyethylene wax is present in the sulfur wax asphalt binder composition in an amount effective to increase the viscoelastic properties as compared to the viscoelastic properties of the base asphalt.

18 Claims, 5 Drawing Sheets

(56) References Cited

U.S. PATENT DOCUMENTS

| | | |
|---|---|---|
| 6,380,284 B1 | 4/2002 | Lopez |
| 6,759,453 B2 | 7/2004 | Jelling et al. |
| 8,198,350 B2 | 6/2012 | Fee et al. |
| 2011/0203484 A1 | 8/2011 | Hwang et al. |
| 2012/0108704 A1 | 5/2012 | Vaidya et al. |

FOREIGN PATENT DOCUMENTS

| | | |
|---|---|---|
| CN | 1990554 A | 7/2007 |
| CN | 1990583 A | 7/2007 |
| CN | 101205371 | 6/2008 |
| EP | 2357210 A1 | 8/2011 |
| KR | 20080048232 | 6/2008 |
| WO | 0077098 | 12/2000 |
| WO | 01/90250 A1 | 11/2001 |
| WO | 2012/061579 A1 | 5/2012 |

OTHER PUBLICATIONS

Edwards, Y., et al., Influence of commercial waxes and polyphosphoric acid on bitumen and asphalt concrete performance at low and medium temperatures, Materials and Structures, 2006, pp. 725-737, vol. 39.

PCT International Search Report and the Written Opinion of the International Searching Authority dated Jun. 23, 2014; International Application No. PCT/US2013/033144; International File Date: Apr. 7, 2014.

Tasdemir, Y., High Temperature Properties of Wax Modified Binders and Asphalt Mixtures; Construction and Building Materials; Oct. 1, 2009; pp. 3220-3224; vol. 23, No. 10; Elsevier, Netherlands; www.elsevier.com/locate/conbuildmat.

ENHANCING PROPERTIES OF SULFUR EXTENDED ASPHALT USING POLYETHYLENE WAX

FIELD OF THE INVENTION

Generally, this invention relates to asphalt compositions. More specifically, this invention relates to asphalt binder compositions including a base asphalt, elemental sulfur and polyethylene wax, and methods of making the same.

BACKGROUND OF THE INVENTION

As modern commerce depends on reliable and cost-effective methods for delivering products from suppliers to users, the availability of durable and reliable highways, roads and other support surfaces for vehicles is vital for sustaining a modern economy. To provide better support surfaces, highways, roads, and sidewalks are commonly paved with a layer or mat of asphaltic concrete that is laid over the surface of the sub-base. Asphalt is preferred over cement to pour roads because it is less expensive and very durable. Asphalt can also be poured at night, which allows major roads to be shut down at the least busy of times for maintenance. Relative to road noise, asphalt is also quieter than cement, making it the better choice for roads.

Asphalt concrete is essentially a mixture of bitumen, as binder, with aggregate, in particular filler, sand, and stones. There are many different types of asphalts available and their characteristics can vary quite significantly. The design of asphalt mix for bituminous paving application is a complex process of selecting and proportioning materials to obtain the desired properties in the finished construction while minimize undesirable characteristics.

In evaluating and adjusting mix design, the aggregate gradation and the binder content in the final mix is balanced between the stability and durability requirements for the intended use. The final goal of mix design is to achieve a balance among all of the desired properties. Binders and various polymers have been investigated for reaching similar goals, and other modifications have been studied.

Unsaturated thermoplastic elastomers like styrene-butadiene-styrene (SBS) block copolymers are polymers used for asphalt modification. They enhance the elastic recovery capacities of asphalt and, therefore, its resistance to permanent deformations. However, unsaturated elastomeric polymers are quite expensive and are subjected to degradation when exposed to atmospheric agents and mechanical stress. Due to their fragility, they are typically used as virgin polymers. This can result in a significant cost increase for the product. While SBS is recognized for performance benefits, research has focused on most cost effective modifiers in exchange for sacrificing superior performance. In addition, many virgin polymers were used before in the modification of asphalt including polyethylene. However, these polymers are expensive in comparison with industrial wastes such as polyethylene wax.

Olefinic polymers also have been investigated for use as modifiers. They are available in large quantities with different mechanical properties and at low cost. Polyethylene (PE) and polypropylene (PP) are plastomers that have also been used. They bring a high rigidity (i.e., lack of elasticity, resistance to bending) to the product and significantly reduce deformations under traffic load. Due to their non-polar nature, PE and PP suffer from the drawback that they are almost completely immiscible with asphalt, and are thus limited in use. PE has a melting point in the range 110°-140° C. depending on the type of PE. PP has a higher melting point. The higher melting temperatures limit the complete mixing of the polyolefin with asphalt where the typical mixing temperatures are in the range 140°-160° C.

Conventional asphalts often do not retain sufficient elasticity in use and also exhibit a plasticity range which is too narrow for use in many modern applications such as road construction. The characteristics of road asphalts can be improved by incorporating into them an elastomeric-type polymer. There exists a wide variety of polymers that can be mixed with asphalt. Of these, SBS is a commonly used polymer in asphalt modification. The modified asphalts thus obtained are commonly referred to variously as bitumen/polymer binders or asphalt/polymer mixes. There is a need for a modification to hotmix asphalt concrete mixes that would increase the resistance to permanent deformation while maintaining or increasing the modulus of the mix at intermediate temperatures without affecting the binder properties significantly.

The bituminous binders, including of the bitumen/polymer type, which are employed at the present time in road applications, often do not have the optimum characteristics at low enough polymer concentrations to consistently meet the increasing structural and workability requirements imposed on roadway structures and their construction. In order to achieve a given level of modified asphalt performance, various polymers are added at some prescribed concentration. Current practice is to add the desired level of a single polymer, sometimes along with a reactant which promotes cross-linking of the polymer molecules until the desired asphalt properties are met. This reactant typically is sulfur in a form suitable for reacting.

Sulfur, especially "free" or "elemental" sulfur, is an abundant and inexpensive material. Elemental sulfur is a byproduct of non-sweet natural gas and petroleum processing. Sources of free sulfur include petroleum refineries and gas sweetening plants. Because of the quantity of sulfur extracted from natural gas and petroleum, many sulfur producers consider elemental sulfur a waste product.

Others have attempted to use waste sulfur as an expander or filler for asphalt binders, but only with limited success. These efforts have only been successful in incorporating a small amount of sulfur into the asphalt binder, typically only up to a few percent of the total composition.

Those skilled in the art understand that sulfur forms hydrogen sulfide ($H_2S$) gas, which is toxic to humans, starting at around 150° C. At and above that temperature, free sulfur in hydrocarbon environments dehydrogenates hydrocarbons and forms hydrogen sulfide. Heating sulfur to high temperatures in the presence of oxygen forms sulfur dioxide, which is noxious to humans and is an air pollutant. It is desirable to find a combination of asphalt materials that are workable at temperatures below 150° C. for worker comfort and safety as well as being more to the environment.

It is also desirable to find commercial uses for elemental sulfur. Incorporating sulfur into commercial products can transform what many consider a potential "waste" product into a product that has practical value.

When added to bitumen at 140° C., sulfur is finely dispersed in bitumen as uniformly small particles; coagulation and settlement of sulfur particles become noticeable after a few hours. Therefore, the sulfur extended asphalt (SEA) mixtures can be produced directly in the mixing plant just before the laying of the asphalt mixture. One major concern in handling sulfur-asphalt mix is the fear of the evolution of hydrogen sulfide ($H_2S$) during production and laying. This problem can be ameliorated by adding carbon or ash to sulfur. H$_2$S evolution starts at temperatures higher than 150° C., so that the application at temperatures up to 150° C. avoids pollution and safety problems. However, H$_2$S evolution starts well below 150° C., i.e. about 130° C., which is undesirable from an environmental perspective. Moreover, below 120° C., neither the reaction of the asphalt and sulfur nor the cross-linking of the SBS/sulfur blend could take place.

Besides performance and environmental issues associated with many types of asphalt modifiers, many of the polymers that are used to modify asphalt compositions are expensive and can be difficult to obtain in remote areas of the world.

A need exists for asphalt compositions with improved properties and reduced environmental and economic impact.

SUMMARY

Generally, this invention relates to asphalt compositions. More specifically, this invention relates to asphalt binder compositions including asphalt, elemental sulfur and polyethylene wax, and methods of making the same.

In some aspects, the invention provides a sulfur wax asphalt binder composition that includes a base asphalt having viscoelastic properties, an elemental sulfur, and a polyethylene wax. The polyethylene wax is combined with the base asphalt and the elemental sulfur to create the sulfur wax asphalt binder composition. The polyethylene wax is present in the sulfur wax asphalt binder composition in an amount effective to increase the viscoelastic properties as compared to the viscoelastic properties of the base asphalt.

In other aspects, the invention provides using the sulfur wax asphalt binder to make an asphalt composition that also includes an aggregate material and a filler.

In another aspect, the invention provides a method of making the sulfur wax asphalt composition. The polyethylene wax is mixed with the base asphalt at a first predetermined temperature in a high shear blender for a first predetermined amount of time to produce an asphalt polyethylene wax mixture. Elemental sulfur is then added to the asphalt polyethylene wax mixture and mixed for a second predetermined amount of time at a second predetermined temperature such that intimate mixing of the elemental sulfur and the asphalt polyethylene mixture is achieved.

DETAILED DESCRIPTION OF THE INVENTION

Figure 1:
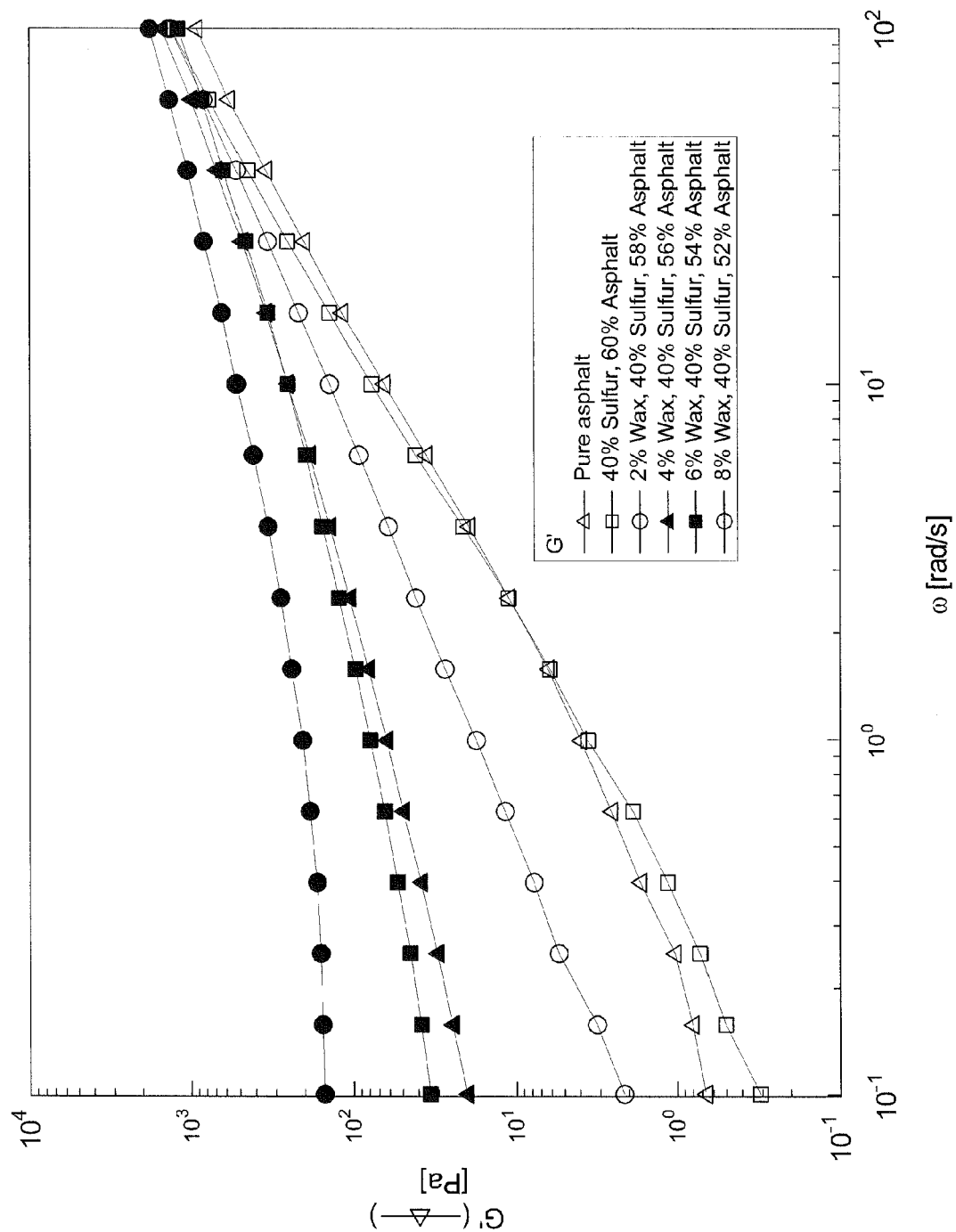
FIG. 1 shows the storage modulus of some embodiments of the sulfur wax asphalt compositions.

Although the following detailed description contains many specific details for purposes of illustration, it is understood that one of ordinary skill in the art will appreciate that many examples, variations and alterations to the following details are within the scope and spirit of the invention. Accordingly, the exemplary embodiments of the invention described herein and provided in the appended figures are set forth without any loss of generality, and without imposing limitations, on the claimed invention.

In some aspects, the invention provides a sulfur wax asphalt binder composition that includes a base asphalt having viscoelastic properties, an elemental sulfur, and a polyethylene wax. The polyethylene wax is combined with the base asphalt and the elemental sulfur to create the sulfur wax asphalt binder composition. The polyethylene wax is present in the sulfur wax asphalt binder composition in an amount effective to increase the viscoelastic properties as compared to the viscoelastic properties of the base asphalt. The use of polyethylene wax with a melting point of approximately 70° C. eases the mixing process and provides enough elasticity to improve the performance of the asphalt.

The base asphalt material can be a singular material or a blend of several base asphalts. All asphalts contain asphaltenes. Asphaltenes include clusters of large polycyclic aromatic molecules. The structure of asphaltenes may include, in no particular order or regularity, cyclo-alkanes, cyclo-alkenes, and alkane and alkene chains extending from polycyclic molecules for up to 30 carbons (C$_{30}$) in length. Asphaltenes can also have functional moieties that are capable of reacting with other materials. Functional moieties include alcohols, carboxylic acids, ketones, phenols, amines, amides, sulfides, sulfoxides, sulfones, sulfonic acids, and porphyrin rings chelated with vanadium, nickel, and iron. Asphaltenes can also have heterorganic aromatic rings part of their overall polycyclic structure, including benzothiophene, pyrrole and pyridine rings.

Asphalt is a colloidal dispersion of asphaltenes in a maltenes phase. The maltenes phase, which is more mobile than the asphaltene phase, include asphaltene resins, polar and non-polar aromatics, cyclic saturated hydrocarbons (e.g., naphthenes), and both straight and long-chain saturated hydrocarbons. Although not intending to be bound by theory, it is believed that the polar aromatics in the maltene phase tend to be the dispersing agent for the asphaltenes, interacting with polar functional groups that can exist on asphaltenes. One so inclined can at least partially extract maltenes from the dispersion using an n-alkane-based solvent; asphaltenes resist such treatment.

All asphalts containing asphaltenes are suitable as the base asphalt. Asphaltene concentration can vary in amount and functionality depending on the source of the base asphalt. The asphaltene content of the base asphalt is in the range of from about 0.01% by weight to about 30% by weight of the base asphalt. Suitable base asphalts include those asphalts capable of being "Performance Graded" using the Performance Grade table ("Table 1") of the AASHTO Performance Graded Asphalt Binder Specification M 320.

In some embodiments, the sulfur wax asphalt binder composition ranges from about 40% wt to 90% wt base asphalt. In further embodiments, the sulfur wax asphalt binder composition ranges is about 40% wt base asphalt. In further embodiments, the sulfur wax asphalt binder composition ranges is about 45% wt base asphalt. In further embodiments, the sulfur wax asphalt binder composition ranges is about 50% wt base asphalt. In further embodiments, the sulfur wax asphalt binder composition ranges is about 55% wt base asphalt. In further embodiments, the sulfur wax asphalt binder composition ranges is about 60% wt base asphalt. In further embodiments, the sulfur wax asphalt binder composition ranges is about 65% wt base asphalt. In further embodiments, the sulfur wax asphalt binder composition ranges is about 70% wt base asphalt. In further embodiments, the sulfur wax asphalt binder composition ranges is about 75% wt base asphalt. In further embodiments, the sulfur wax asphalt binder composition ranges is about 80% wt base asphalt. In further embodiments, the sulfur wax asphalt binder composition ranges is about 85% wt base asphalt. In further embodiments, the sulfur wax asphalt binder composition ranges is about 90% wt base asphalt.

The elemental sulfur includes not only singular sulfur atoms but also sulfur in complexes and covalently bonded to other sulfur atoms, including α-sulfur (orthorhombic sulfur), β-sulfur (monoclinic sulfur), and "catena" sulfur. Chains or rings of sulfur atoms range from a few sulfur atoms to hundreds of covalently linked sulfur atoms. All allotropes of elemental sulfur are suitable for use in the sulfur wax asphalt binder compositions. Because of the wide variety of allotropes, elemental sulfur is found in many different solid and liquid forms, and changes between forms based upon modifications to its environment.

Sulfur covalently bonded with non-sulfur atoms, such as carbon, hydrogen or other atomic species, including heterorganic compounds, is not "free" or elemental sulfur.

Elemental sulfur is naturally occurring or is the resultant and residue from natural gas and petroleum production and treatment processes. For example, natural gas sweetening processes often include hydrogen sulfide to elemental sulfur conversion units ("Claus units"). Elemental sulfur should not contain any significant amounts of impurities.

In further embodiments, the sulfur wax asphalt binder composition ranges from about 10% wt to 50% wt elemental sulfur. In further embodiments, the sulfur wax asphalt binder composition is about 10% wt elemental sulfur. In further embodiments, the sulfur wax asphalt binder composition is about 15% wt elemental sulfur. In further embodiments, the sulfur wax asphalt binder composition is about 20% wt elemental sulfur. In further embodiments, the sulfur wax asphalt binder composition is about 25% wt elemental sulfur. In further embodiments, the sulfur wax asphalt binder composition is about 30% wt elemental sulfur. In further embodiments, the sulfur wax asphalt binder composition is about 35% wt elemental sulfur. In further embodiments, the sulfur wax asphalt binder composition is about 40% wt elemental sulfur. In further embodiments, the sulfur wax asphalt binder composition is about 45% wt elemental sulfur. In further embodiments, the sulfur wax asphalt binder composition is about 50% wt elemental sulfur. In further embodiments, the elemental sulfur is up to 50% wt of the sulfur wax asphalt binder composition. In some embodiments, the elemental sulfur is in solid form. In some embodiments, the elemental sulfur is powder. In other embodiments, the sulfur is in liquid form.

Polyethylene waxes have the general formula $(CH_2)_nH_2$, where n ranges between about 50 and 100. Polyethylene waxes have a wide variety of molecular weights and degrees and lengths of long chain branching which alter the physical characteristics of the polyethylene wax. Generally, polyethylene wax is white powdery, lumpy, or flaky product. It is non-toxic, and has a specific gravity about 0.9. Polyethylene generally has good dispersion and fluidity. In some preferred embodiments, the polyethylene has a melting point of approximately 73° C.

In further embodiments, the sulfur wax asphalt binder composition ranges from about 2% wt to 10% wt polyethylene wax. In further embodiments, the sulfur wax asphalt binder composition is about 2% wt polyethylene wax. In further embodiments, the sulfur wax asphalt binder composition is about 3% wt polyethylene wax. In further embodiments, the sulfur wax asphalt binder composition is about 4% wt polyethylene wax. In further embodiments, the sulfur wax asphalt binder composition is about 5% wt polyethylene wax. In further embodiments, the sulfur wax asphalt binder composition is about 6% wt polyethylene wax. In further embodiments, the sulfur wax asphalt binder composition is about 7% wt polyethylene wax. In further embodiments, the sulfur wax asphalt binder composition is about 8% wt polyethylene wax. In further embodiments, the sulfur wax asphalt binder composition is about 9% wt polyethylene wax. In further embodiments, the sulfur wax asphalt binder composition is about 10% wt polyethylene wax.

In a further embodiment, the asphalt is about 52% wt, elemental sulfur is about 40% wt, and the polyethylene wax is 8% wt.

In other aspects, the invention provides using the sulfur wax asphalt binder to make an asphalt composition that also includes an aggregate material and filler. In further embodiments, the sulfur wax asphalt binder composition ranges from about 5 to 6.5% wt of the asphalt composition. In some embodiments, the sulfur wax asphalt binder composition is about 5% wt of the asphalt composition.

Asphalt compositions often include aggregates. Aggregates can vary in physical properties, shapes, texture, water absorption, and other properties. In some embodiments, the aggregate with be a coarse aggregate. In other embodiments, the aggregate will be a fine aggregate. In further embodiments, the aggregate material is a gravel, sand, crushed stone, slag, recycled concrete or a geosynthetic aggregate. In further embodiments, the aggregate includes two or more different aggregate materials.

In some embodiments, the filler is a mineral filler. In further embodiments, the filler is a limestone powder, a limestone dust, or a cement dust. In further embodiments, the aggregate includes two or more different filler materials.

The asphalt compositions have the present invention have improved properties over asphalt alone. For instance, in some embodiments, the asphalt composition has greater temperature resistance than that of asphalt alone. In further embodiments, the asphalt composition has improved waterproofing properties as compared to that of the base asphalt of alone. In other embodiments, the asphalt composition has improved damp-proofing properties as compared to that of the base asphalt alone.

The asphalt compositions described herein can be used for a number of different purposes, including applications where improved waterproofing and damp proofing are desired. In some embodiments, the asphalt composition is used in paving applications. In some embodiments, the asphalt composition is used in asphalt concrete pavement. In other embodiments, the asphalt is used in roofing applications. The asphalt compositions can be used in any applications where use of a sulfur extended asphalt would be beneficial.

In another aspect, the invention provides a method of making the sulfur wax asphalt composition. The polyethylene wax is mixed with the base asphalt at a first predetermined temperature in a high shear blender for a first predetermined amount of time to produce an asphalt polyethylene wax mixture. Elemental sulfur is then added to the asphalt polyethylene wax mixture and mixed for a second predetermined amount of time at a second predetermined temperature such that intimate mixing of the elemental sulfur and the asphalt polyethylene mixture is achieved.

In some embodiments, the first predetermined temperature ranges from about 135 to 150° C. In further embodiments, the first predetermined temperature is about 145° C.

In some embodiments, the second predetermined temperature ranges from about 135 to 150° C. In further embodiments, the second predetermined temperature is about 145° C. In some embodiments, the first predetermined amount of time ranges from about 2 to 5 minutes. In further embodiments, the first predetermined amount of time is about 2 minutes.

In some embodiments, the second predetermined amount of time ranges from about 8 to 12 minutes. In further embodiments, the second predetermined amount of time is about 10 minutes.

EXAMPLES

In the examples provided herein various tests were performed to evaluate the sulfur wax asphalt compositions. Among the tests conducted were the SuperPave test developed by the Strategic Highway Research Program, rheology tests of the sulfur wax asphalt compositions using a dynamic shear rheometer, and penetration grade and softening point tests.

The elemental sulfur used in the tests was a co-product of oil and gas processing. It had a melting point of 115° C. The elemental sulfur was ground to reduce particle size and to enhance mixing with hot asphalt.

The polyethylene wax used in the tests was collected from TASNEE Petrochemicals complex, Jubail Industrial City, Saudi Arabia. The polyethylene wax had a melting peak temperature of 73° C.

In the compositions the polyethylene wax was mixed with a base asphalt at a temperature of 145° C. in a high shear blender for 2 minutes to create a polyethylene wax/base asphalt mixture. The sulfur powder was then added to the a polyethylene wax/base asphalt mixture and blended for 10 minutes in a high shear blender at a temperature of 145° C. to ensure uniform distribution of the sulfur and wax.

SuperPave tests developed by the Strategic Highway Research Program were conducted. Performance Grading (PG) of asphalt binder was determined based on several tests of fresh and aged asphalt binder. The machines used for short and long term ageing were the Rolling Thin Film Oven (RTFO) and Pressure Ageing Vessel (PAV). Fresh asphalt binder as well as residue from RTFO and PAV was tested to provide indications of the binder resistance to rutting and fatigue, respectively. The Bending Beam Rheometer (BBR) test also provided a measure of low temperature stiffness and relaxation properties of the asphalt binders. These parameters give an indication of an asphalt binder's ability to resist low temperature cracking. The BBR is used in combination with the DTT to determine an asphalt binder's low temperature PG grade.

As with other SuperPave binder tests, the actual temperatures anticipated in the area where the asphalt binder will be placed determined the test temperatures used. Because low temperature cracking is a phenomenon found mostly in older pavements, the test was run on the long-term aged residue from the PAV.

The complete PG was determined using specification data acquired from SuperPave tests. The tests were conducted at the required test temperatures. Table 1 represents summary of PG tests for pure and modified asphalt binder with various sulfur and wax content.

TABLE 1

PG test summary of selected sulfur wax asphalt binder composition

| Sample # | Percentages of different components | | | PG | Max. Temp attained, ° C. |
| --- | --- | --- | --- | --- | --- |
| | Sulfur % | Asphalt % | Wax % | | |
| Pure Asphalt | 0 | 100 | 0 | 64-10 | 68 |
| 1 | 10 | 88 | 2 | 58-10 | 61 |
| 2 | 10 | 86 | 4 | 58-10 | 63 |
| 3 | 10 | 84 | 6 | 64-10 | 66.25 |
| 4 | 10 | 82 | 8 | 64-10 | 67.25 |
| 5 | 20 | 78 | 2 | 64-10 | 64 |
| 6 | 20 | 76 | 4 | 64-10 | 67 |
| 7 | 20 | 74 | 6 | 64-10 | 68.5 |
| 8 | 20 | 72 | 8 | 64-10 | 69.5 |
| 9 | 30 | 68 | 2 | 64-10 | 66.5 |
| 10 | 30 | 66 | 4 | 64-10 | 69 |
| 11 | 30 | 64 | 6 | 70-10 | 73 |
| 12 | 30 | 62 | 8 | 70-10 | 75 |
| 13 | 30 | 60 | 10 | 76-10 | 76 |
| 14 | 40 | 58 | 2 | 70-10 | 72.5 |
| 15 | 40 | 56 | 4 | 70-10 | 74 |
| 16 | 40 | 54 | 6 | 70-10 | 75 |
| 17 | 40 | 52 | 8 | 76-10 | 77.5 |

TABLE 2

Complex modulus of 30% and 40% sulfur binder for different wax content

| Sample # | Sample compositions | Complex modulus, G* (Pa) @ 67° C. | Percentage increase in G* | Complex modulus, G* (Pa) @ 73° C. | Percentage increase in G* | Complex modulus, G* (Pa) @ 79° C. | Percentage increase in G* |
| --- | --- | --- | --- | --- | --- | --- | --- |
| 1 | Pure Asphalt | 1121.51 | | 563.29 | | 295.11 | |
| 2 | 30% Sulfur, 70% Asphalt | 718.67 | −35.92 | 398.74 | −29.21 | 243.08 | −17.63 |
| 3 | 2% Wax, 30% Sulfur, 68% Asphalt | 911.64 | −18.71 | 537.47 | −4.58 | 334.52 | 13.35 |
| 4 | 4% Wax, 30% Sulfur, 66% Asphalt | 1454.66 | 29.71 | 794.70 | 41.08 | 384.54 | 30.30 |
| 5 | 6% Wax, 30% Sulfur, 64% Asphalt | 1669.92 | 48.90 | 948.93 | 68.46 | 483.37 | 63.79 |

TABLE 2-continued

Complex modulus of 30% and 40% sulfur binder for different wax content

| Sample # | Sample compositions | Complex modulus, G* (Pa) @ 67° C. | Percentage increase in G* | Complex modulus, G* (Pa) @ 73° C. | Percentage increase in G* | Complex modulus, G* (Pa) @ 79° C. | Percentage increase in G* |
|---|---|---|---|---|---|---|---|
| 6 | 8% Wax, 30% Sulfur, 62% Asphalt | 2362.32 | 110.64 | 1213.59 | 115.45 | 501.76 | 70.02 |
| 7 | 40% Sulfur, 60% Asphalt | 968.47 | −13.65 | 630.60 | 11.95 | 419.12 | 42.02 |
| 8 | 2% Wax, 40% Sulfur, 58% Asphalt | 1708.52 | 52.34 | 923.74 | 63.99 | 429.36 | 45.49 |
| 9 | 4% Wax, 40% Sulfur, 56% Asphalt | 2742.03 | 144.49 | 1140.90 | 102.54 | 476.87 | 61.59 |
| 10 | 6% Wax, 40% Sulfur, 54% Asphalt | 3243.16 | 189.18 | 1349.21 | 139.52 | 561.61 | 90.31 |
| 11 | 8% Wax, 40% Sulfur, 52% Asphalt | 3994.02 | 256.13 | 1632.26 | 189.77 | 669.26 | 126.78 |

Figure 5:
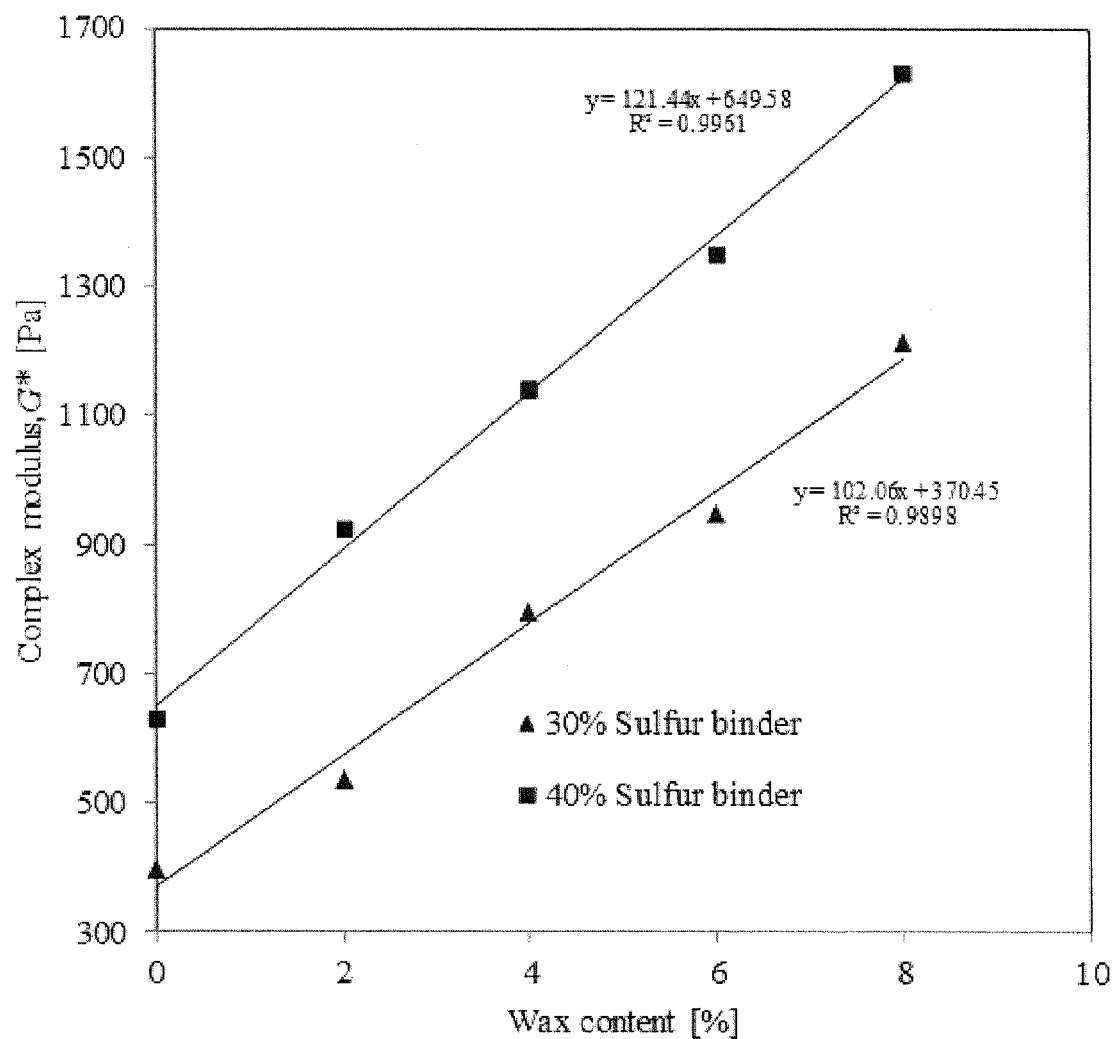
FIG. 5 shows the complex modulus of some embodiments of the sulfur wax asphalt compositions.

Table 2 shows the values of complex modulus for 30% and 40% sulfur wax asphalt binder compositions with 0-8% polyethylene wax content for three different temperature levels. The values show that increased polyethylene wax content increased the complex modulus of the sulfur wax asphalt binder composition. FIG. 5 shows the phenomena that the complex modulus increased linearly with polyethylene wax content.

Softening Point Test: Specimens were prepared exactly as specified (ASTM D36-95) in precisely dimensioned brass rings and maintained at a temperature of not less than 10° C. below the expected softening point for at least 30 minutes before the test. The rings and assembly, and two ball bearings, were placed in a liquid bath filled to a depth of 105±3 mm and the whole maintained at a temperature of 5±1° C. for 15 minutes. A 9.5 mm steel ball bearing (weighing 3.50±0.05 g) was centered on each specimen and heat was then applied to the beaker so as to raise the temperature by 5±0.5° C. per minute. The temperature at which each bitumen specimen touched the base plate was recorded to the nearest 0.2° C.

Penetration Grade Test: A sample was heated until it became fluid and then was poured in a container to a depth such that when cooled, the depth of sample was at least 10 mm greater than the expected penetration. The molten sample was then allowed to cool in an atmospheric temperature and then was cooled in a water bath for one hour at 25° C. The needle was mounted on the sample, such that it just touched the surface of sample. The needle was allowed to penetrate freely at the same time for 5 seconds. The depth of penetration was measured. One grade penetration is defined as 0.1 mm depth. At least three reading were taken for every sample and the average was taken for penetration grade point.

The results of softening point and penetration grade tests are shown in Table 3. The result shows that incorporation of polyethylene wax to the binder composition increased the softening point and decreased the penetration grade. Increases in softening points indicate a higher temperature resistance of the binder composition. Decreases in penetration grade increase the stiffness of the binder composition and therefore broaden its range of potential applications.

TABLE 3

Softening Points and Pentration Grade

| Sample # | Sample composition | Softening point (° C.) | Penetration grade |
|---|---|---|---|
| 1 | Pure asphalt | 52.4 | 52 |
| 2 | Wax 8%, S 40% and A 52% | 63.25 | 44.3 |
| 3 | Wax 8%, S 30% and A 62% | 58.75 | 47.5 |
| 4 | S 40% and A 60% | 56.5 | 50.4 |
| 5 | S 30% and A 50% | 51.50 | 53 |

S: Sulfur,
A: Asphalt

Figure 2:
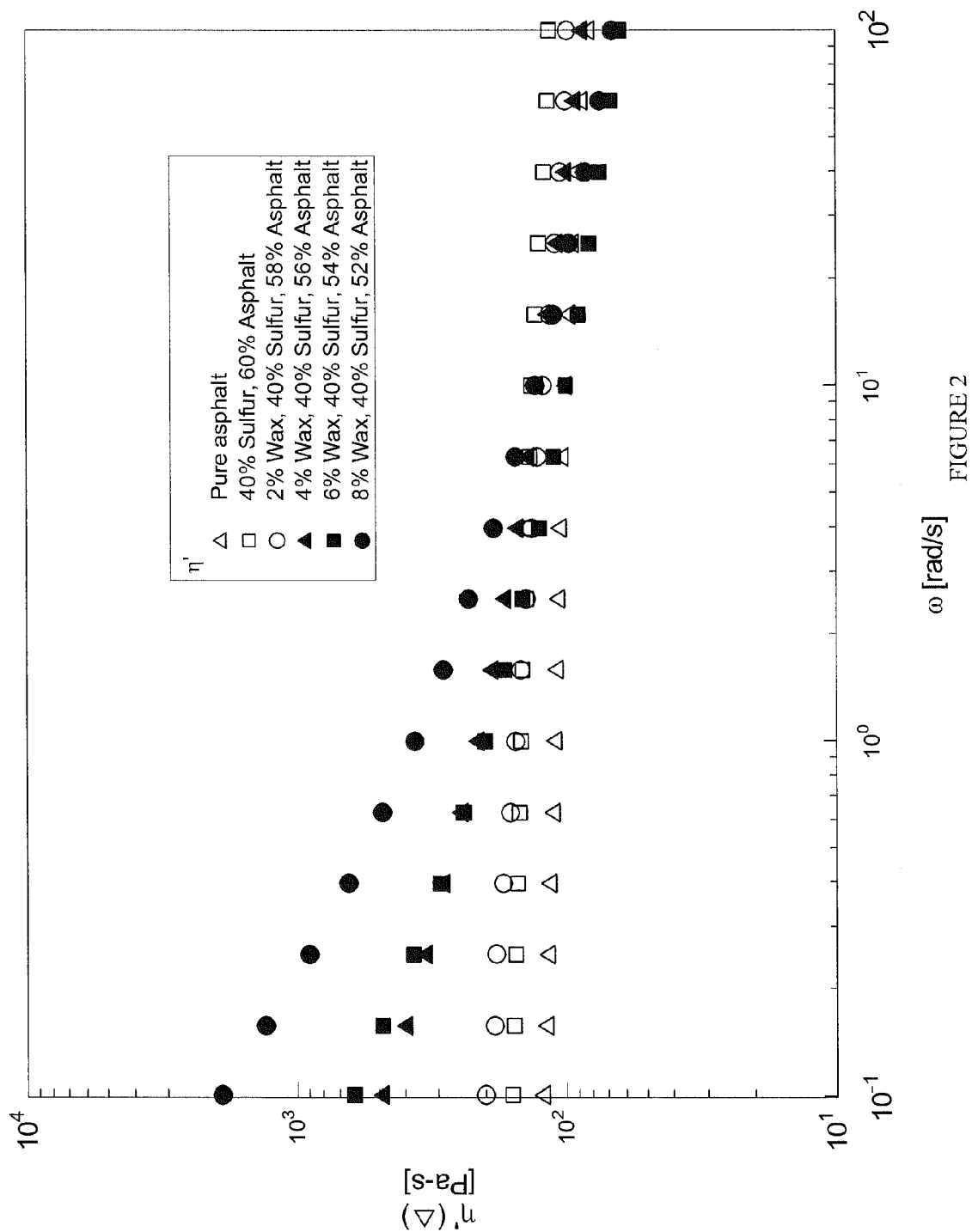
FIG. 2 shows the dynamic viscosities of some embodiments of the sulfur wax asphalt compositions.

The dynamic shear rheology of sulfur wax asphalt binder compositions was also analyzed. FIGS. 1 and 2 represent the typical dynamic shear rheology of sulfur wax asphalt binder composition at 70° C. FIG. 1 shows that the 40/60 sulfur asphalt mix was very similar to that of pure asphalt in terms of behavior. However, incorporation of polyethylene wax in the sulfur asphalt binder compositions increased the storage modulus significantly. This increase in elastic modulus increases the strength of asphalt compositions and will expand their life under traffic load. FIG. 2 shows that the addition of polyethylene wax to the sulfur wax asphalt binder composition increased the dynamic shear viscosity for low frequency and decreased at high frequency. Thus, at high frequency there was shear thining and in low frequency yield stress behavior was observed. The exhibited decrease in viscosity with shear is beneficial for the mixing process and the increase in elasticity is beneficial for increasing the rutting resistance.

Figure 3:
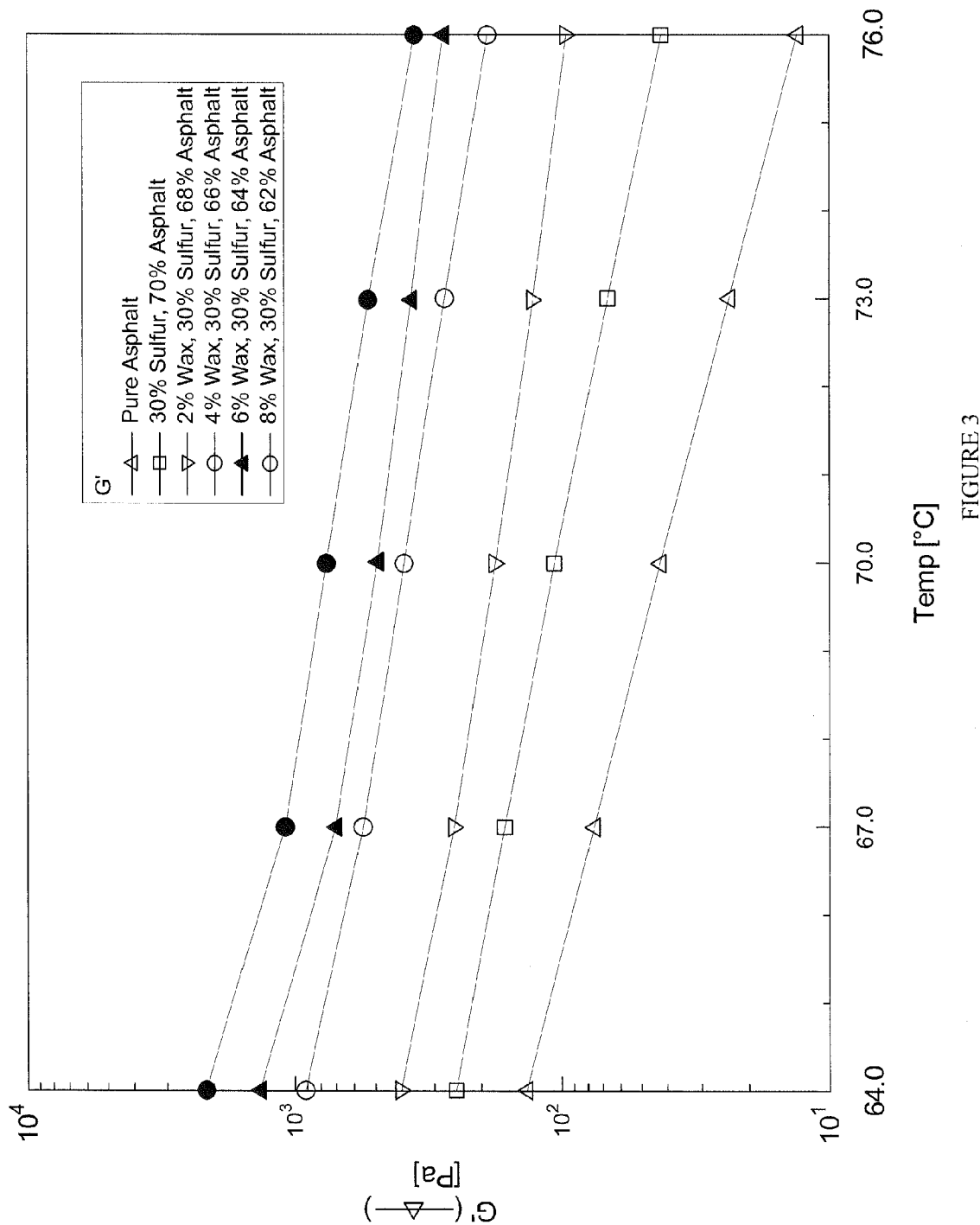
FIG. 3 shows the storage modulus of some embodiments of the sulfur wax asphalt compositions.
Figure 4:
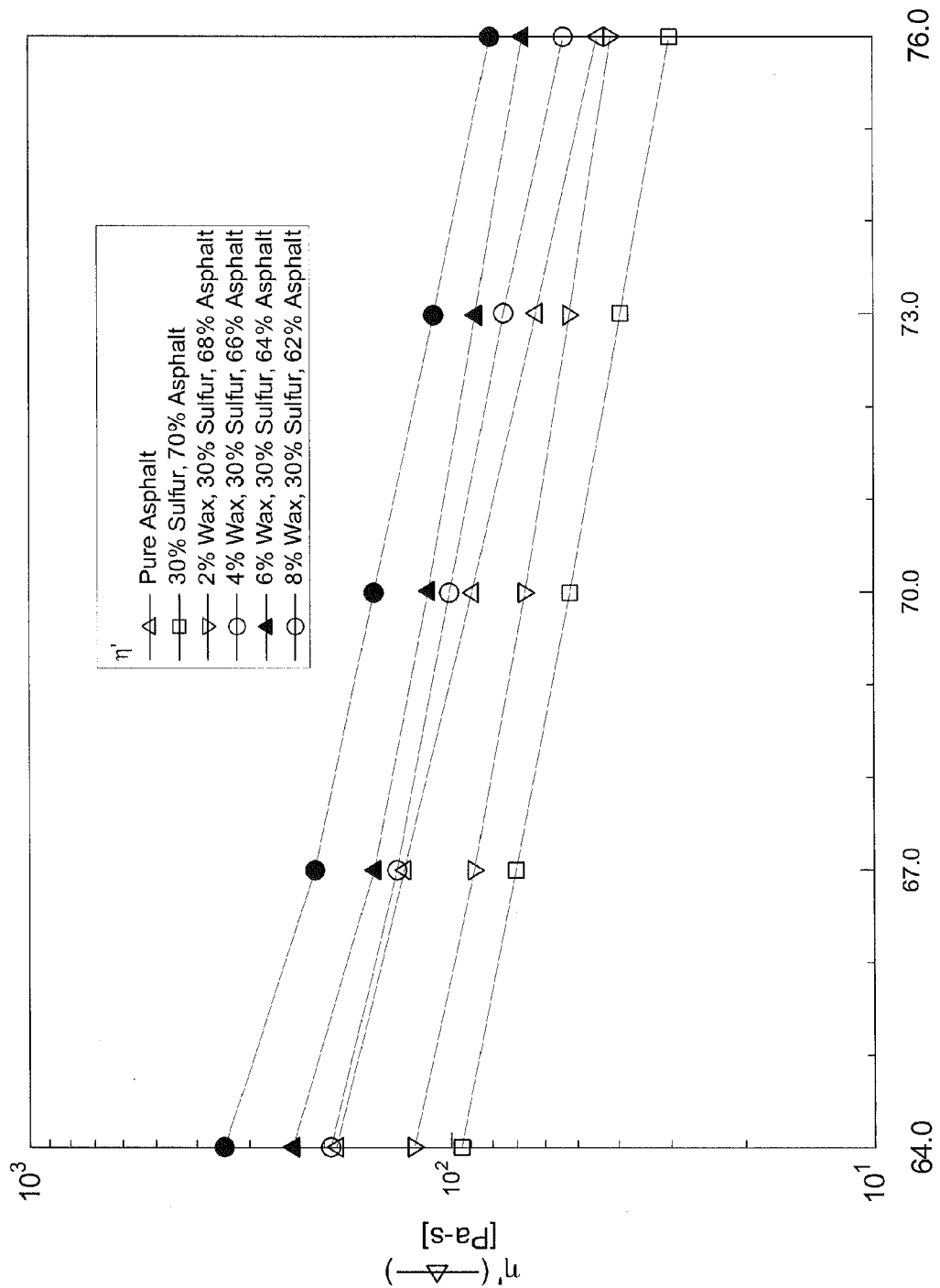
FIG. 4 shows the dynamic viscosities of some embodiments of the sulfur wax asphalt compositions.

Temperature sweep tests of sulfur wax asphalt binder compositions were also conducted. FIGS. 3 and 4 represent the results of temperature sweep tests for sulfur wax asphalt binder compositions for the 30% sulfur mix. FIG. 3 shows the storage moduli of the sulfur wax asphalt binder composition as a function of temperature. The slope of the curve decreased with the increase in polyethylene wax content. This indicates that the sulfur wax asphalt binder composition becomes less sensitive to temperature. FIG. 4 shows the effect of temperature on dynamic viscosity of the sulfur wax asphalt binder compositions. FIG. 4 shows that for a wax content of 4% or more the viscosity change of sulfur wax asphalt binder compositions was less than that of pure asphalt and unmodified sulfur/asphalt binder. Both of these observations confirm that the sulfur wax asphalt binder compositions have higher resistance to temperature cracking and rutting.

Although the present invention has been described in detail, it should be understood that various changes, substitutions, and alterations can be made hereupon without departing from the principle and scope of the invention. Accordingly, the scope of the present invention should be determined by the following claims and their appropriate legal equivalents.

The singular forms "a", "an" and "the" include plural referents, unless the context clearly dictates otherwise.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

As used herein and in the appended claims, the words "comprise," "has," and "include" and all grammatical variations thereof are each intended to have an open, non-limiting meaning that does not exclude additional elements or steps.

As used herein, terms such as "first" and "second" are arbitrarily assigned and are merely intended to differentiate between two or more components of an apparatus. It is to be understood that the words "first" and "second" serve no other purpose and are not part of the name or description of the component, nor do they necessarily define a relative location or position of the component. Furthermore, it is to be understood that that the mere use of the term "first" and "second" does not require that there be any "third" component, although that possibility is contemplated under the scope of the present invention.

What is claimed is:

1. An asphalt composition consisting essentially of:
    a sulfur wax asphalt binder composition having:
        base asphalt having viscoelastic properties in an amount of 52% by weight of sulfur wax asphalt binder composition;
        elemental sulfur in amount of 40% by weight of sulfur wax asphalt binder composition; and
        polyethylene wax in an amount of 8% by weight of sulfur wax asphalt binder composition; the polyethylene wax being combined with the base asphalt and the elemental sulfur at a temperature of up to 145° C. to create the sulfur wax asphalt binder composition, the polyethylene wax being present in the sulfur wax asphalt binder composition in an amount effective to increase the viscoelastic properties as compared to the viscoelastic properties of the base asphalt; wherein
    the sulfur asphalt binder composition is included in the asphalt composition in an amount of 5% to 6.5% weight of the asphalt composition;
    an aggregate material; and
    a filler.

2. The asphalt composition of claim 1, wherein the sulfur wax asphalt binder composition is about 5% by weight of the asphalt composition.

3. The asphalt composition of claim 1, wherein the aggregate material is a gravel.

4. The asphalt composition of claim 1, wherein the filler is a mineral filler.

5. The asphalt composition of claim 1, wherein the asphalt composition has improved viscoelastic properties compared to the viscoelastic properties of asphalt alone.

6. The asphalt composition of claim 1, wherein the asphalt composition has improved waterproofing properties as compared to that of asphalt.

7. The asphalt composition of claim 1, wherein the asphalt composition has improved damp-proofing properties as compared to that of asphalt.

8. The asphalt composition of claim 1, for use in paving.

9. The asphalt composition of claim 1, for use in roofing.

10. The asphalt composition of claim 1, wherein the asphalt composition has a Performance Grading of PG 76-10.

11. A method of making the asphalt composition of claim 1 comprising the steps of:
    mixing the polyethylene wax with the base asphalt at a first predetermined temperature in a high shear blender for a first predetermined amount of time to produce an asphalt polyethylene wax mixture;
    adding elemental sulfur to the asphalt polyethylene wax mixture to produce a sulfur wax asphalt binder composition and mixing for a second predetermined amount of time at a second predetermined temperature such that intimate mixing of the elemental sulfur and the asphalt polyethylene mixture is achieved;
    adding an aggregate material and a filler to the sulfur wax asphalt binder composition to produce an asphalt composition;
    wherein the first and second predetermined temperatures are each up to 145° C.

12. The method of claim 11 further wherein the elemental sulfur is in powder form.

13. The method of claim 11 further wherein the elemental sulfur is ground to reduce particle size.

14. The method of claim 11 further wherein the first predetermined temperature is about 145° C.

15. The method of claim 11 further wherein the second predetermined temperature is about 145° C.

16. The method of claim 11 further wherein the first predetermined amount of time is about 2 minutes.

17. The method of claim 11 further wherein the second predetermined amount of time is about 10 minutes.

18. An asphalt composition comprising:
    a sulfur wax asphalt binder having:
        a base asphalt having viscoelastic properties in amount of 62% by weight of sulfur wax asphalt binder composition;
        elemental sulfur in amount of 30% by weight of sulfur wax asphalt binder composition; and
        polyethylene wax in amount of 8% by weight of sulfur wax asphalt binder composition, the polyethylene wax being combined with the base asphalt and the elemental sulfur at a temperature of up to 145° C. to create the sulfur wax asphalt binder composition, the polyethylene wax being present in the sulfur wax asphalt binder composition in an amount effective to increase the viscoelastic properties as compared to the viscoelastic properties of the base asphalt; wherein
    the sulfur wax asphalt binder composition is in an amount of 5% to 6.5% by weight of the asphalt composition;
    an aggregate material; and
    a filler.

* * * * *

UNITED STATES PATENT AND TRADEMARK OFFICE
CERTIFICATE OF CORRECTION

PATENT NO. : 9,546,275 B2  
APPLICATION NO. : 13/859324  
DATED : January 17, 2017  
INVENTOR(S) : Parvez et al.

It is certified that error appears in the above-identified patent and that said Letters Patent is hereby corrected as shown below:

In the Claims

In Claim 1, Column 11, at Line 54, the claim language reads:
"the sulfur asphalt binder composition is included in the"

It should read:
"the sulfur wax asphalt binder composition is included in the"

Signed and Sealed this
Ninth Day of May, 2017

Michelle K. Lee
*Director of the United States Patent and Trademark Office*